United States Patent
Karp

Patent Number: 6,138,135
Date of Patent: Oct. 24, 2000

[54] PROPAGATING NANS DURING HIGH PRECISION CALCULATIONS USING LESSER PRECISION HARDWARE

[75] Inventor: Alan H. Karp, Palo Alto, Calif.

[73] Assignee: Institute for the Development of Emerging Architectures, L.L.C., Cupertino, Calif.

[21] Appl. No.: 09/141,246

[22] Filed: Aug. 27, 1998

[51] Int. Cl.[7] .................................................. G06F 7/38
[52] U.S. Cl. ........................... 708/496; 708/513; 708/525
[58] Field of Search ................................. 708/496, 497, 708/513, 525, 530, 551

[56] References Cited

U.S. PATENT DOCUMENTS

| | | | |
|---|---|---|---|
| 5,341,320 | 8/1994 | Trissel et al. ............................. | 708/496 |
| 5,481,489 | 1/1996 | Yanayida et al. ....................... | 708/525 |
| 5,631,859 | 5/1997 | Markstein et al. ...................... | 708/513 |
| 5,732,005 | 3/1998 | Kahle et al. ............................. | 708/525 |
| 6,049,865 | 4/2000 | Smith ...................................... | 708/496 |

Primary Examiner—David H. Malzahn

[57] ABSTRACT

A floating point arithmetic unit provides consistent propagation of NaNs while performing high precision calculations on hardware designed to perform lower precision calculations. In one embodiment, the floating point arithmetic unit is provided with a microcode memory that stores more than one set of NaN propagation rules. In operation, the floating point arithmetic unit accesses one of the sets of NaN propagation rules according to the precision of the calculation being performed. A method of performing calculations in a floating point arithmetic unit includes dynamically determining if a calculation to be performed is to be a quad precision calculation or a double precision calculation. If it is determined that a quad precision calculation is to be performed, quad precision NaN propagation rules are selected and a quad precision calculation is performed using the selected quad precision NaN propagation rules. Likewise, if it is determined that a double precision calculation is to be performed, double precision NaN propagation rules are selected and a double precision calculation is performed using the selected double precision NaN propagation rules. By providing more than one set of NaN propagation rules and selecting one of the sets of NaN propagation rules depending on the precision of the calculation being performed, propagation of NaNs in conformance with IEEE standards can be assured. The method and apparatus are easily extended to higher precision calculations to ensure proper propagation of NaNs regardless of the precision calculation.

17 Claims, 4 Drawing Sheets

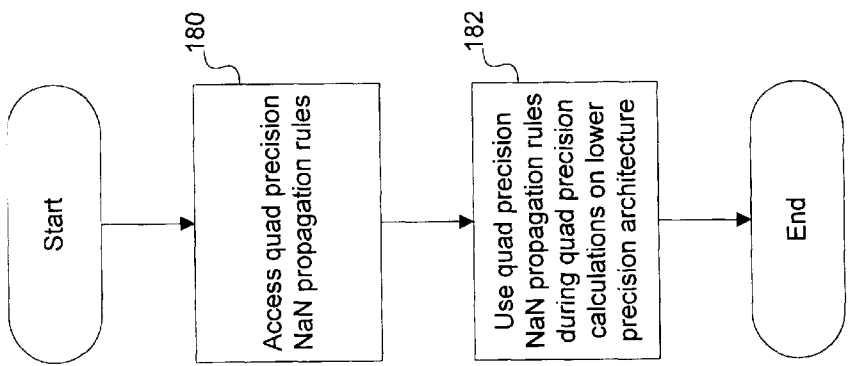
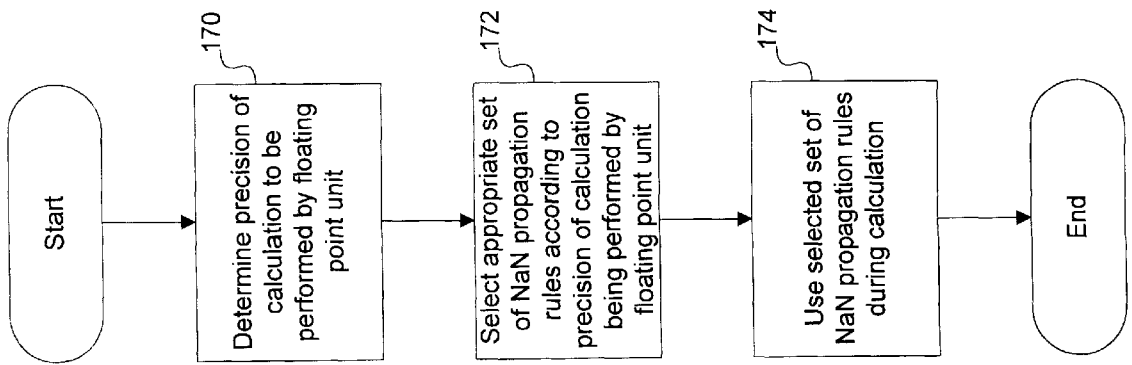

PROPAGATING NANS DURING HIGH PRECISION CALCULATIONS USING LESSER PRECISION HARDWARE

BACKGROUND OF THE INVENTION

1. Field of the Invention

The present invention relates generally to a data processing system having a floating point arithmetic unit and, more particularly, to a method and apparatus for propagating NaNs during the performance of high precision arithmetic operations in a floating point arithmetic unit having hardware implemented for lesser precision.

2. Related Art

The arrival of computers has made it possible to perform rapidly complex numerical calculations. Many applications, such as weather forecasting, seismology, simulation, genome sequencing, etc., require numerous complex numerical calculations to be performed. More importantly, these applications must be performed in a timely fashion. For example, if the result of the calculation is not timely, the weather may have already occurred before it has been forecast, thus rendering the forecast useless. Advances in microprocessor performance has made such complex applications a reality. As computers continue to operate faster and more efficiently, it is likely that an even larger number of computationally intensive complex problems will become solvable.

When calculations are performed on a computer, a certain amount of error is introduced due to the need to round off numbers so that they can be represented by a finite number of digits. Such errors will be referred to herein "round-off error." In many complicated calculations, iterative procedures are commonplace. Unfortunately, the iterative nature of the calculations results in an accumulation of such round-off errors. Thus, even a small loss of precision due to round-off error may grow to a large inaccuracy after several iterations.

Many computers use a floating point arithmetic unit to perform mathematical computations. A floating point number is a digit string characterized by three components: a sign, signed exponent and significand(s). Its numeric value, if any, is the signed product of its significand and the radix (r) raised to the power of its exponent (exp). Floating point numbers are often governed by IEEE standard 610.5-1990. In this context, the radix is defined as the quantity whose successive integer powers are the implicit multipliers of the sequence of digits that represent a number in some positional notation system. Thus, in a floating point system, a number is represented by $s*R^{exp}$. In a binary computer, the radix is equal to 2.

The degree of accuracy of the final result of a calculation performed using a floating point arithmetic unit is directly related to the number of digits of significand used at all processing steps of the computation. Thus, to avoid erroneous calculations, it is desirable to use significands having many digits.

An additional motivation for the use of long significands is the problem of arithmetic operations involving quantities of vastly differing magnitudes, e.g., the addition of a very small quantity to a very large quantity. To perform addition using a floating point arithmetic unit, the significand of each operand is typically shifted so that both quantities have the same exponent, and the significands are then added together. Aligning the significands frequently requires shifting one (or both) significand(s). This may cause some bits of the significand to be lost, for example, by shifting the significand beyond the field available for significand storage. Larger significands, therefore, increase accuracy by extending the range within which shifts may be made without a loss of precision.

There are several standard levels of precision available in many computers. IEEE standard 754 specifies a significand of 23 bits for single precision and a significand of 52 bits for double precision. These formats correspond to approximately seven and sixteen significant decimal digits, respectively. As discussed above, due to the accumulation of round-off error and when adding numbers of vastly different magnitudes, some calculations are inaccurate even when using double precision. In these situations, it is desirable to use higher precision, such as quad precision, which uses a 113 bit significand.

It is possible to build hardware that will perform quad precision floating point calculations. Unfortunately, although such hardware is capable of performing floating point calculations accurately, it has several undesirable properties. First, quad precision hardware has generally required 128-bit wide data paths and large arithmetic logic units ("ALUs"). These data paths and large ALUs consume valuable area on the microprocessor that could otherwise be used for other functions. Second, wide data paths and large ALUs inherently imply longer execution times. Since not every calculation requires quad precision, the use of quad precision hardware can adversely impact the performance speed of the floating point arithmetic unit, at least with respect to operations that could otherwise be adequately performed using single or double precision hardware.

Thus, it is desirable to perform quad precision calculations using double precision hardware. One such system is disclosed, for example, in U.S. Pat. No. 5,631,859, which obtains quad precision results by performing a sequence of double precision operations on double precision hardware. Essentially, this system represents a quad precision number using two double precision numbers, a first of which represents the high portion of the quad precision number and the second of which represents the low portion of the quad precision number. The high and low portions are manipulated through a sequence of double precision operations to perform a calculation on the quad precision quantity as a whole. By performing quad precision calculations using double precision hardware, the advantages associated with quad precision are realized without experiencing the attendant decrease in processor speed for calculations that do not require quad precision.

Certain quantities are mathematically undefined, such as zero divided by zero and infinity divided by zero. These mathematically undefined quantities cannot have an ordinary numerical value and thus cannot be treated in the usual manner by the floating point arithmetic unit. IEEE standard 754-1989 specifies how these quantities, referred to as NaNs (Not a Number), are to be propagated through the floating point arithmetic unit. One convenient method for processing NaNs is to provide the floating point arithmetic unit with a set of NaN propagation rules. Generally, these NaN propagation rules are stored as part of the microcode associated with the floating point arithmetic unit.

When quad precision calculations are performed on quad precision hardware, the quad precision hardware is generally provided with an associated set of NaN propagation rules to ensure that NaNs are propagated through the quad precision hardware according to the IEEE standard. Likewise, double precision is generally provided with a set of NaN propagation rules that govern propagation of NaNs through double precision calculations to ensure that NaNs are propagated according to the IEEE standard.

One example of a conventional system for performing quad precision calculations using a floating point arithmetic unit having double precision hardware is shown in FIG. 3. NaN propagation in floating point arithmetic units has typically been treated with NaN propagation rules for double precision hardware. Thus, after NaN propagation rules for the double precision algorithm has been accessed (150), the floating point arithmetic unit determines whether quad precision has been requested (152). If so, the floating point arithmetic unit performs quad precision operations using double precision hardware, and directs propagation of NaNs through the calculations using the rules for double precision calculations (154). If quad precision calculations have not been requested, double precision calculations are performed and NaN propagation is performed using the same double precision NaN propagation rules (156).

When quad precision calculations are performed on double precision hardware, however, the propagation rules used by the double precision hardware do not yield the same result as would have been yielded by the quad precision hardware had quad precision hardware been used to perform those same calculations. Thus, under certain circumstances, a double precision floating point arithmetic unit will return an incorrect result when used to perform quad precision mathematical calculations.

Accordingly, there is a need for a method and apparatus that is capable of accurately performing quad precision mathematical calculations. Moreover, there is a need to propagate accurately NaNs through quad precision calculations using double precision hardware.

SUMMARY OF THE INVENTION

The present invention is a method and apparatus that is capable of propagating NaNs accurately through quad precision calculations using double precision hardware.

In one embodiment, a floating point arithmetic unit provides consistent propagation of NaNs while performing high precision calculations on hardware designed to perform lower precision calculations. To do so, the floating point arithmetic unit is provided with a microcode memory that stores NaN propagation rules. At least one of the NaN propagation rules is unique to quad precision calculations. The unique NaN propagation rules for double precision calculations and quad precision calculations will be called sets of NaN propagation rules. In operation, the floating point arithmetic unit accesses one of the sets of NaN propagation rules according to the precision of the calculation being performed and uses the accessed set of NaN propagation rules during performance of the calculation. The sets of NaN propagation rules may overlap substantially and may be stored by the hardware in one or more tables. When stored in one table, the individual sets may be extracted selectively from the table.

In a preferred embodiment, the set of NaN propagation rules for double precision calculations and the set of NaN propagation rules for quad precision calculations are stored in the same table by the hardware. In this embodiment, the set of NaN propagation rules for double precision calculations is a subset of the set of NaN propagation rules for quad precision calculations.

In another embodiment, a method of performing calculations in a floating point arithmetic unit includes dynamically determining if a calculation to be performed is to be a quad precision calculation or a double precision calculation. If it is determined that a quad precision calculation is to be performed, quad precision NaN propagation rules are selected from a plurality of sets of NaN propagation rules and a quad precision calculation is performed using the selected quad precision NaN propagation rules. Likewise, if it is determined that a double precision calculation is to be performed, double precision NaN propagation rules are selected from a plurality of sets of NaN propagation rules and a double precision calculation is performed using the selected double precision NaN propagation rules. By providing more than one set of NaN propagation rules and selecting one of the sets of NaN propagation rules depending on the precision of the calculation being performed, propagation of NaNs in conformance with IEEE standards can be assured. In further embodiments, NaN propagation is assured regardless of the degree of precision by providing an appropriate set of NaN propagation rules for each degree of precision and enabling the floating point arithmetic unit to select the set of NaN propagation rules depending on the precision of the calculation being performed.

Sets of NaN propagation rules for use with this invention can be complete individual discrete sets of rules, or can be formed of a single basic set of rules that is modified according to the precision of the calculation being performed.

Further features and advantages of the present invention as well as the structure and operation of various embodiments of the present invention are described in detail below with reference to the accompanying drawings. In the drawings, like reference numerals indicate identical or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following description when taken in conjunction with the accompanying drawings, in which:

FIG. 5 is a flow chart illustrating a method of propagating NaNs through a floating point arithmetic unit capable of performing floating point calculations of various precision; and FIG. 6 is a flow chart illustrating a method of propagating NaNs through a double precision floating point arithmetic unit only capable of performing quad precision floating point calculations.

DETAILED DESCRIPTION

Embodiments of the invention are discussed below with reference to FIGS. 1–6. However, those skilled in the art will readily appreciate that the detailed description given herein with respect to these figures is for explanatory purposes only and that the invention extends beyond these illustrated embodiments.

Figure 1:
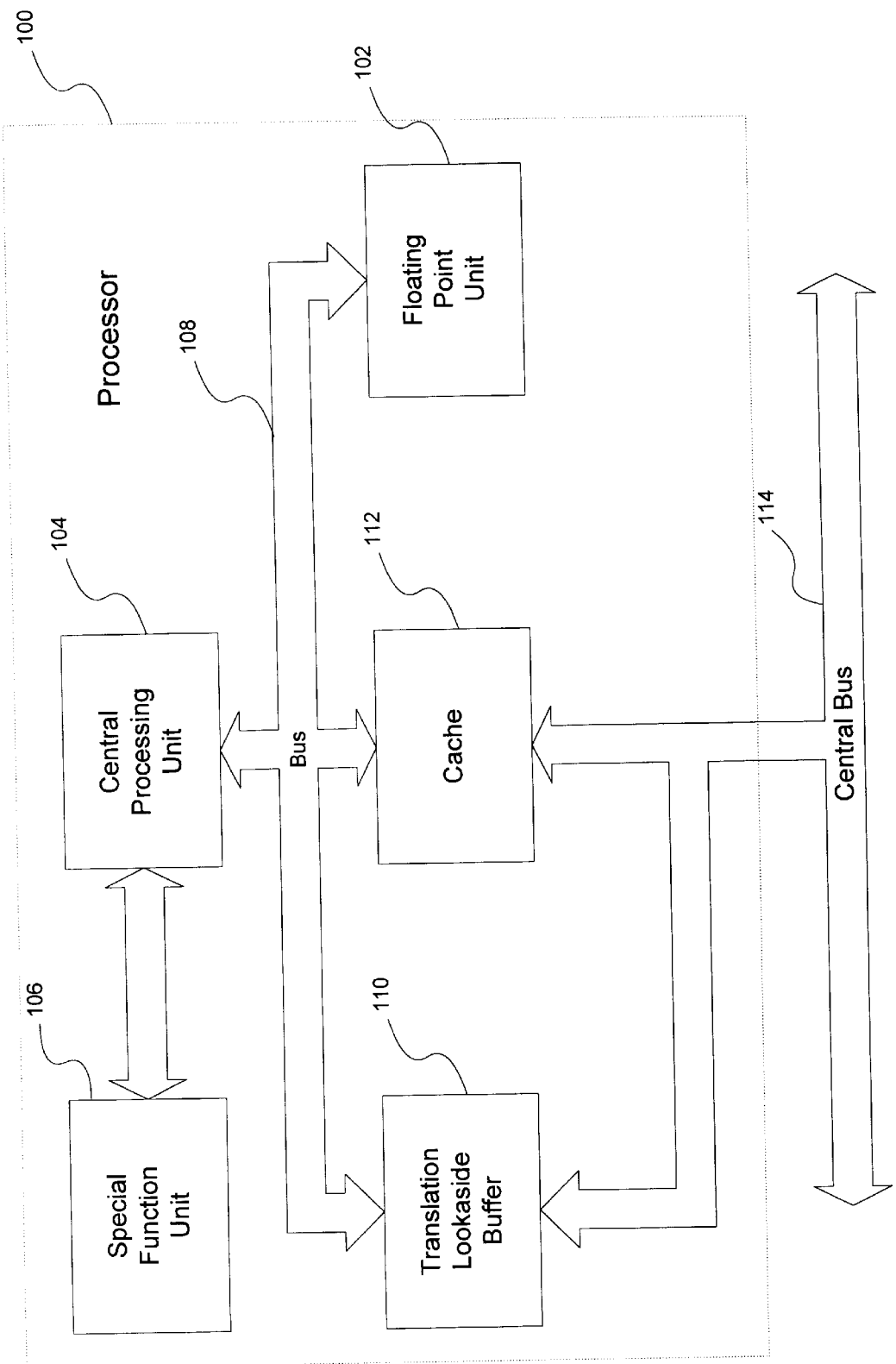
FIG. 1 is a block diagram of a processor having a floating point arithmetic unit in accordance with preferred embodiment of the invention.

FIG. 1 is a block diagram of a processor 100 incorporating a floating point arithmetic unit 102 for performing quad precision calculations using double-precision hardware. A processor of this type will typically include various components, such as a central processing unit 104, one or more special function units 106, a translation look aside buffer 110, a cache 120, and a bus 108 interconnecting these various components and the floating point arithmetic unit. The processor 100 is connected to other processors and peripheral devices via a central bus 114 which is connected to the cache 112 and to the translation look aside buffer 110. While these components are often found useful to implement the processor 100, they are not essential or crucial to this invention. Accordingly, additional components may be added to the processor 100 or one or more of these components may be removed from the processor 100 depending on the particular needs of the application for which the processor 100 is designed and desires of the designer.

Figure 2:
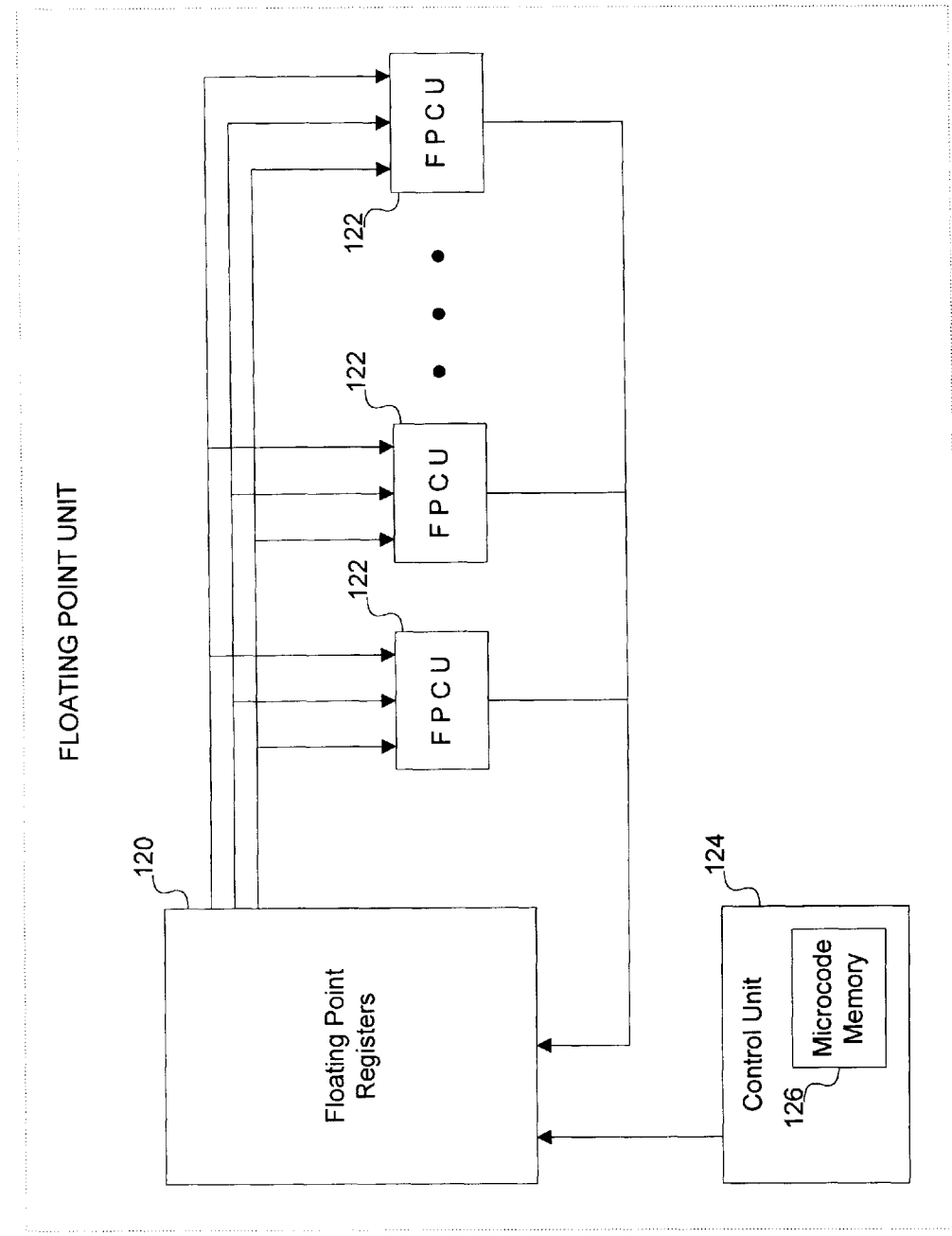
FIG. 2 is a block diagram of a floating point arithmetic unit in accordance with a preferred embodiment of the invention.

The floating point arithmetic unit 102 will be discussed in greater detail below in conjunction with FIG. 2, which is a block diagram of the floating point arithmetic unit 102 according to a preferred embodiment of the invention. The floating point arithmetic unit 102 illustrated in FIG. 2 is preferably a multiply-add-fused (MAF) floating point arithmetic unit. In a multiply-add-fused floating point arithmetic unit, a multiplication unit and an adder are fused together so that multiplication and addition may occur as a single operation. Typically, in such a floating point arithmetic unit, the basic operation performed by the floating point arithmetic unit can be represented mathematically as: x=a*b+c. To perform addition, a or b is set equal to 1 so that x=1*b+c or x=a*1+c; to perform multiplication, c is set equal to zero, so that x=a*b+0.

As shown in FIG. 2, an exemplary floating point arithmetic unit 102 has floating point registers 120 and a plurality of floating point computation units 122. A control unit 124 receives instructions in a known manner and controls operation of the floating point arithmetic unit 102. Control of the floating point arithmetic unit 102 by the control unit 124 is based on microcode instructions stored in a microcode memory unit 126. Examples of types of calculations capable of being carried out by an exemplary floating point arithmetic units include taking the reciprocal of number, multiplication of two numbers, addition and subtraction of two numbers, a fused multiply and addition or subtraction of two numbers, and the negative of a fused multiply and addition or subtraction of two numbers. Several of these quad precision calculations require multiple operations by the floating point calculation units. The microcode memory contains instructions for carrying out these procedures and is well known in the art. The rules governing propagation of NaNs are also embodied in instructions contained in the microcode memory 126.

One exemplary set of rules for NaN propagation will now be discussed. These rules for NaN propagation were developed for use with Hewlett Packard's double precision floating point arithmetic unit that is capable of performing quad precision calculations, which is described in U.S. Pat. No. 5,631,859, entitled FLOATING POINT ARITHMETIC UNIT HAVING LOGIC FOR QUAD PRECISION ARITHMETIC, the specification of which is hereby incorporated by reference in its entirety. While performing double precision calculations, this floating point arithmetic unit uses the NaN propagation rules set forth in Table I.

TABLE I

| f3 * | f4 + | f2 → | fma<br>fnma<br>fms<br>f1 |
|---|---|---|---|
| — | NaN | — | f4 |
| — | — | NaN | f2. |
| NaN | — | — | f3 |
| NaN | NaN | — | f3 |
| NaN | — | NaN | f3 |
| — | NaN | NaN | f4 |
| NaN | NaN | NaN | f3 |

In Table I, fma, fnma and fms are instructions that can be used by a programmer to have the floating point arithmetic unit perform a particular calculation. In the referenced floating point arithmetic unit, fma=floating point multiply add; fnma=floating point negative multiply add; and fms=floating point multiply subtract. Recall that the function being performed by the floating point arithmetic unit is x=a*b+c. This is rewritten in the table above as f1=f3*f4+f2. Thus, the result of the function being performed (f1) is illustrated in the final column of the Table I. The other three columns specify values for the variables of the function f1=f3*f4+f2. Thus, for example, in line one, f3 and f2 are any number and f4 is a NaN. In this situation, the operation fma, fnma or fms will return the NaN in f4.

These rules do not provide proper propagation of NaNs when the referenced double precision floating point arithmetic unit is used to perform quad precision calculations. To perform quad precision calculations on a double precision floating point arithmetic unit, each quad precision number must be represented by two double precision numbers, one of which represents the high portion of the quad precision number and one of which represents the low portion of the quad precision number. Because the double precision floating point arithmetic unit only operates on one double precision number at a time, however, the double precision floating point arithmetic unit must be asked to operate on the high and low portions of the quad precision number independently.

The NaN propagation rules set forth in Table II enable the proper propagation of NaNs through quad precision calculations performed on the referenced double precision floating point arithmetic unit.

TABLE II

| f3 * | f4 + | f2 → | fma<br>fnma<br>fms<br>f1 | fmal<br>fnmal<br>f1 |
|---|---|---|---|---|
| — | NaN | — | f4 | f4 |
| — | — | NaN | f2 | f2 |
| NaN | — | — | f3 | f3 |
| NaN | NaN | — | f3 | f3 |
| NaN | — | NaN | f3 | f2 |
| — | NaN | NaN | f4 | f2 |
| 1 | NaN | NaN | f2 | f2 |
| NaN | NaN | NaN | f3 | f2 |

Other NaN propagation rules may work equally well depending on the type of floating point arithmetic unit being used and the equations used by that floating point arithmetic unit to perform the various calculations. In Table II, fma, fnma, fms, fmal and fnmal are instructions that can be used by a programmer to have the floating point arithmetic unit perform a particular calculation. In the referenced floating point arithmetic unit, fma=floating point multiply add (high portion); fmal=floating point multiply add (low portion); fnma=floating point negative multiply add (high portion); fnmal=floating point negative multiply add (low portion); and fms=floating point multiply subtract.

One unique aspect of this selection of NaN propagation rules is shown in lines six and seven of Table II. In lines six and seven, two different NaN propagation rules have been selected for the same pair of input NaNs, depending on whether only addition or a fused multiply and add is being performed. This is reflected in the fact that a different NaN is returned for fma, fnma and fms when f3=1 (addition) than when f3 is any other number (fused multiply add).

A comparison of Table I and Table II indicates that the remaining quad precision NaN propagation rules for fma, fnma and fms are identical to the NaN propagation rules used for double precision operations. The selection of a unique NaN propagation rule for the situation where f3=1 requires additional functionality to be added to the NaN propagation microcode, but is one of the keys to obtaining proper propagation of NaNs in the quad precision algorithms when using double precision hardware. Since fmal and fnmal return the low portion of the quad precision quantity, these operations do not exist in double precision calculations. Thus, unique NaN propagation rules associated with fmal and fnmal have been developed.

While the two sets of NaN propagation rules have been set forth above in two independent tables, in actuality, due to the large amount of overlap between the two tables, the two sets of NaN propagation rules are preferably stored as a single table to be selectively accessed by the floating point arithmetic unit as required.

Note also, that to perform an addition operation in the referenced floating point arithmetic unit, it is necessary to set f3=1; likewise to perform multiplication, it is necessary to set f2=0. These operations are performed by the referenced floating point arithmetic unit using dedicated registers one and zero respectively, instead of simply placing the numeric value of 1.0 and 0.0 in a convenient register. Thus, in this context, f3=1 is an instruction to use register number 1.

As discussed above, when performing quad precision calculations on double precision hardware, the quad precision quantity is split into a high portion and a low portion. These portions are physically located at two memory addresses or are contained in two double precision registers in the floating point arithmetic unit. Thus, for example, if the programmer would like the high portion of a floating point multiply add computation to be returned, the programmer would instruct the floating point arithmetic unit to perform the function f1=fma(f3,f4,f2). If, as shown in line 1 of Table II, f4 was determined to be a NaN, the result of f1=fma(f3,f4,f2) would be the NaN in f4. Likewise, as shown in the last line of Table II, if all three quantities f3, f4, f2 were NaNs, the result f1 of f1=fma(f3,f4,f2) would be the NaN in f3. As such, the NaN propagation rules set forth in Table II above will ensure that NaNs propagate in double precision hardware when that hardware is used to perform quad precision calculations in accordance with the IEEE standard.

Several examples are illustrative of how the NaN propagation rules operate to propagate NaNs through various quad precision algorithms. The equations for performing quad precision calculations discussed below and the accompanying code for implementing the equations are all well known. The interrelationship between the equations or code and the particular NaN propagation rules is not, however, well known. The equations and corresponding code are included herein for illustrative purposes, not to limit application of the inventive concepts described herein.

An algorithm for performing quad precision addition on the double precision hardware described above is set forth below. In this algorithm, "h" denotes the high portion of the double precision quantity and "1" denotes the low portion of the double precision quantity:

$$\text{Sum} = A + B \quad \text{but } A = Ah + zAl; B = Bh + zBl$$
$$= Ah + Bh + z(Al + Bl), \quad \text{let } X = Al + Bl$$
$$= Ah + (Bh + zXh) + z^2 Xl, \quad \text{let } Y = Bh + zXh$$
$$= (Ah + Yh) + zYl + z^2 Xl, \quad \text{let } Z = Ah + Yh$$
$$= Zh + z(Zl + Yl) + z^2 Xl, \quad \text{let } W = Zl + Yl$$
$$= (Zh + zWh) + z^2(Xl + Wl), \quad \text{let } U = Zh + zWh$$
$$= (Uh + zUl) + z^2(Xl + Wl).$$

The code set forth in Table III illustrates this algorithm and shows the results when A is a number and B is a NaN; B is a number and A is a NaN; and both are NaNs. Notice that in the first 2 cases, the result is the input NaN. In the last case, the result is the NaN in A.

TABLE III

| function | f1 = f3 * f4 + f2 |    | A, NaN   | NaN, B   | NaN, NaN |
|----------|-------------------|----|----------|----------|----------|
| fcvtq.l  | A1 = A1,A2        | // | A1       | —        | A1       |
| fcvtq.l  | B1 = B1,B2        | // | —        | B1       | B1       |
| fcvtq.h  | Ah = A1,A2        | // | Ah       | —        | Ah       |
| fcvtq.h  | Bh = B1,B2        | // | —        | Bh       | Bh       |
| fma.l    | Xh = A1,1,B1      | // | A1       | B1       | A1       |
| fma.l    | Yh = Bh,1,Xh      | // | Xh = A1  | Bh       | Bh       |
| fmal.l   | Y1 = 1,Bh,Xh      | // | Xh = A1  | Xh = B1  | Xh = A1  |
| fmal.l   | Z1 = 1,Yh,Ah      | // | Ah       | Yh = Bh  | Ah       |
| fma.l    | Zh = 1,Yh,Ah      | // | Ah       | Yh = Bh  | Ah       |
| fma.l    | Wh = Y1,1,Z1      | // | Y1 = A1  | Y1 = B1  | Y1 = A1  |
| fmal.l   | Wh = Y1,1,Z1      | // | Wh = A1  | Wh = B1  | Wh = A1  |
| fma.l    | Uh = Zh,1,Wh      | // | Zh = Ah  | Zh = Bh  | Zh = Ah  |

Understanding this table is straightforward, once the underlying mathematical operation (f1=f3*f4+f2) is recalled. As discussed above, an operator can instruct the floating point arithmetic unit to return either the high portion of the quad precision value by issuing a command fma (floating point multiply add high) or can instruct the floating point arithmetic unit to return the low portion of the quad precision value by issuing the command fmal (floating point multiply add low). These commands are entries in the left hand side of the table. The first four rows (fcvtq) of the table simply set the initial high and low values for A and B.

The second column of the table reflects the functions performed by the floating point arithmetic unit while making the substitutions in the above addition algorithm. Recall that the floating point arithmetic unit is performing the function f=a*b+c, or, rewritten, f1=f3*f4+f2. Thus, for example, in the fifth row of the second column, Xh=A1*1+B1.

The fourth through sixth columns illustrate the result that will be returned as a result of performing the function in the second column if one or more of A and B are NaNs using the NaN propagation rules set forth in Table II above. It is thus straightforward to show that, at the end of this calculation, the low and high parts of the result are either the correct numeric value or the NaN that would have been propagated had the quad addition been done in hardware.

The algorithm for performing subtraction of quad precision numbers on double precision hardware is identical to the above addition algorithm, except that "−Bh" is substituted for "Bh" and "−B1" is substituted for "B1". Thus, the subtraction algorithm may be represented as follows:

TABLE IV

| function | f1 = f3 * f4 + f2 |    | A, NaN  | B, NaN  | Both    |
|----------|-------------------|----|---------|---------|---------|
| fcvtq.1  | A1 = A1,A2        | // | A1      | —       | A1      |
| fcvtq.1  | B1 = B1,B2        | // | —       | B1      | B1      |
| fcvtq.h  | Ah = A1,A2        | // | Ah      | —       | Ah      |
| fcvtq.h  | Bh = B1,B2        | // | —       | Bh      | Bh      |
| fms.1    | Xh = A1,1,B1      | // | A1      | B1      | A1      |
| fnma.1   | Yh = Bh,1,Xh      | // | Xh = A1 | Bh      | Bh      |
| fnma1.1  | Y1 = 1,Bh,Xh      | // | Xh = A1 | Xh = B1 | Xh = A1 |
| fma1.1   | Z1 = 1,Yh,Ah      | // | Ah      | Yh = Bh | Ah      |
| fma.1    | Zh = 1,Yh,Ah      | // | Ah      | Yh = Bh | Ah      |
| fma.1    | Wh = Y1,1,Z1      | // | Y1 = A1 | Y1 = B1 | Y1 = A1 |
| fma1.1   | Wh = Y1,1,Z1      | // | Wh = A1 | Wh = B1 | Wh = A1 |
| fma.1    | Uh = Zh,1,Wh      | // | Zh = Ah | Zh = Bh | Zh = Ah |

At this point, the low and high parts of the result are either the correct numeric value or the NaN that would have been propagated had the quad subtraction been done in hardware.

One embodiment of the multiplication algorithm for use with the fused multiply and add floating point arithmetic unit described above is:

$$\begin{aligned}
Product = A * B \quad &\text{but } A = Ah + zAl; B = Bh + zBl \\
= (Ah + zAl) * (Bh + zBl) \\
= AhBh + zAhBl + zAlBh + z^2(AlBl), \quad &\text{let } X = AlBl \\
= AhBh + zAhBl + z(AhBl + zXh) + z^3 Xl, \quad &\text{let } Y = AhBl + zXh \\
= AhBh + z(AlBh + zYl) + zYh + z^3 Xl, \quad &\text{let } Z = AlBh + zYl \\
= AhBh + zZh + z(Yh + zZl) + z^3 Xl, \quad &\text{let } V = Yh + zZl \\
= AhBh + z(Vh + Zh) + z^2 Vl + z^3 Xl, \quad &\text{let } U = Vh + Zh \\
= (AhBh + zUh) + z^2(VlUl) + z^3 Xl. \quad &\text{let } R = AhBh + zUh
\end{aligned}$$

$$\begin{aligned}
Sum = A - B \quad &\text{but } A = Ah + zAl; B = Bh + zBl \\
= Ah - Bh + z(Al - Bl), \quad &\text{let } X = Al - Bl \\
= Ah + (-Bh + zXh) + z^2 Xl, \quad &\text{let } Y = -Bh + zXh \\
= (Ah + Yh) + zYl + z^2 Xl, \quad &\text{let } Z = Ah + Yh \\
= Zh + z(Zl + Yl) + z^2 Xl, \quad &\text{let } W = Zl + Yl \\
= (Zh + zWh) + z^2(Xl + Wl), \quad &\text{let } U = Zh + zWh \\
= (Uh + zUl) + z^2(Xl + Wl).
\end{aligned}$$

It is straightforward to show using this algorithm and the NaN propagation rules set forth above that at the end of the calculation, the low and high parts of the result are either the correct numeric value or the NaN that would have been propagated had the quad precision subtraction been done in hardware. In doing so, however, it is important to realize that it is possible to code T=S-R as either fms t=s,l,r (t=s * 1-r) or as fnma r,l,s (t=−r*l+s) to propagate the desired NaN.

The code in Table IV illustrates the subtraction algorithm when A is a number and B is a NaN; B is a number and A is a NaN; and both are NaNs. Notice that in the first 2 cases, the result is the input NaN. In the last case, the result is the NaN in A. Note that the only difference between Table IV and Table III is the type of operation performed by the code reflected in the first column, lines 5–7.

This algorithm, which is considered to be well known in the art, can be converted to:

TABLE V

| function | f1 = f3 * f4 + f2 |    | A, NaN  | B, NaN  | Both    |
|----------|-------------------|----|---------|---------|---------|
| fcvtq.1  | A1 = A1,A2        | // | A1      | —       | A1      |
| fcvtq.1  | B1 = B1,B2        | // | —       | B1      | B1      |
| fcvtq.h  | Ah = A1,A2        | // | Ah      | —       | Ah      |
| fcvtq.h  | Bh = B1,B2        | // | —       | Bh      | Bh      |
| fma.1    | Xh = A1,B1,0      | // | A1      | B1      | A1      |
| fma1.1   | Y1 = Ah,B1,Xh     | // | Xh = A1 | Xh = B1 | Xh = A1 |
| fma.1    | Yh = B1,Ah,Xh     | // | Ah      | B1      | B1      |
| fma1.1   | Z1 = A1,Bh,Y1     | // | Y1 = A1 | Y1 = B1 | Y1 = A1 |
| fma.1    | Zh = A1,Bh,Y1     | // | A1      | Bh      | A1      |
| fma.1    | Vh = 1,Yh,Z1      | // | Z1 = A1 | Z1 = B1 | Z1 = A1 |
| fma.1    | Uh = 1,Zh,Vh      | // | Vh = A1 | Vh = B1 | Vh = A1 |
| fma1.1   | R1 = Ah,Bh,Uh     | // | Uh = A1 | Uh = B1 | Uh = A1 |
| fma.1    | Rh = Ah,Bh,Uh     | // | Ah      | Bh      | Ah      |

Using this algorithm to perform multiplication using the NaN propagation rules set forth above, results in either the correct numerical value or the NaN that would have been propagated had the quad precision multiplication been done in hardware.

Several embodiments of methods of implementing the NaN propagation rules will now be discussed. In a preferred embodiment, floating point arithmetic unit 102 includes logic for executing software that performs functions generally represented by relevant portions of the flowcharts shown in FIGS. 4–6. Alternatively, some or all of the functions generally represented by relevant portions of the flowcharts could be performed by special purpose hardware, such as an application specific integrated circuit (ASIC).

Figure 4:
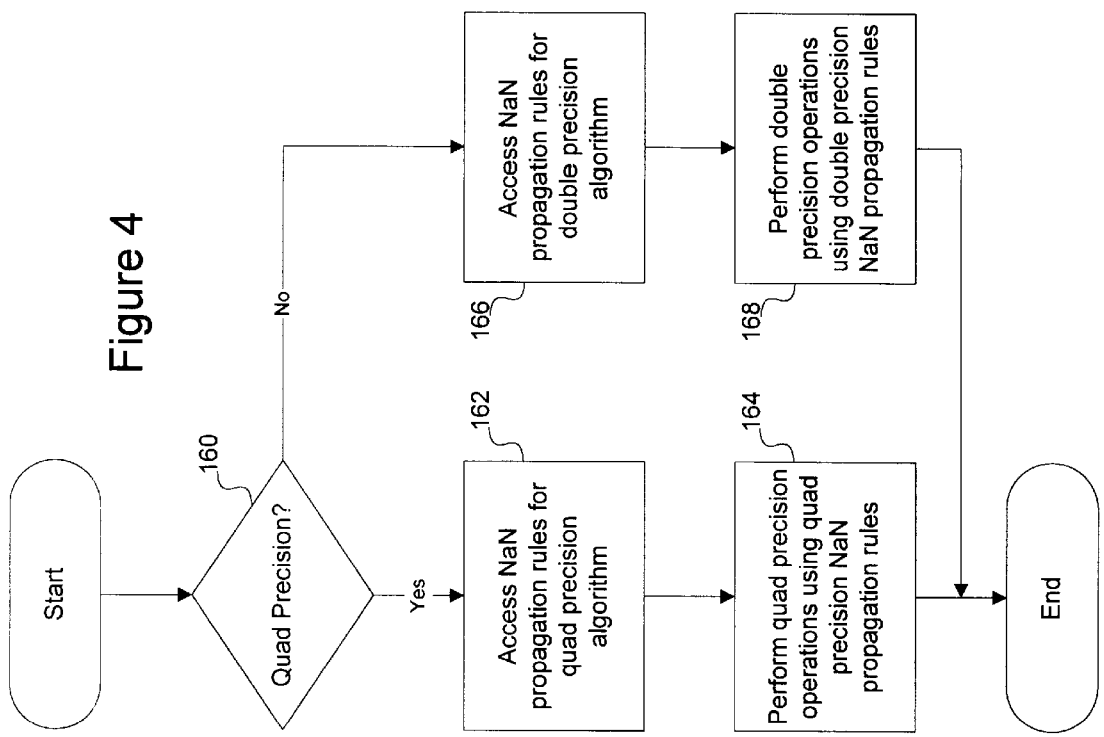
FIG. 4 is a flow chart illustrating a method of propagating NaNs through a double precision floating point arithmetic unit capable of performing both double precision floating point calculations and quad precision floating point calculations.
Figure 3:
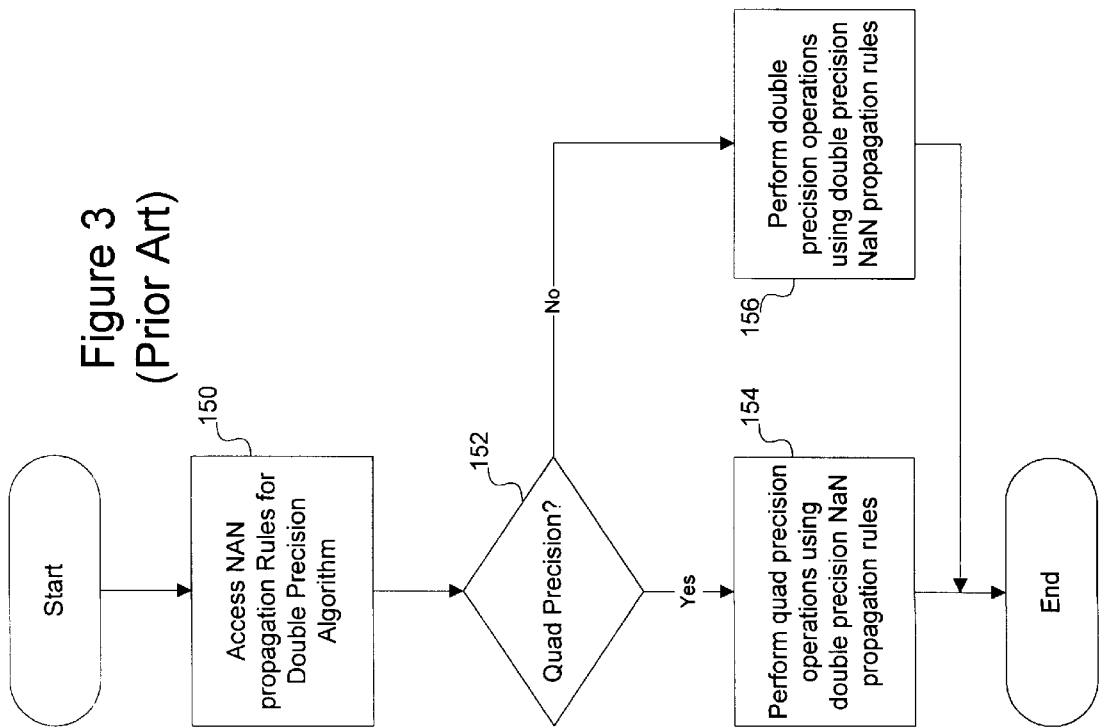
FIG. 3 is a flow chart illustrating a prior art method of propagating NaNs through a double precision floating point arithmetic unit capable of performing both double precision floating point calculations and quad precision floating point calculations.

FIG. 4 illustrates an exemplary method of propagating NaNs through a double precision floating point arithmetic unit capable of performing both double precision floating point calculations and quad precision floating point calculations. In FIG. 4, the floating point arithmetic uses any well-known technique to determine whether quad precision has been requested by a programmer or is otherwise desired or necessary (160). If so, the floating point arithmetic unit accesses the NaN propagation rules for quad precision calculations (162) and performs quad precision calculations using the NaN propagation rules for quad precision calculations (164). If quad precision has not been requested (160), the floating point arithmetic unit accesses a second set of NaN propagation rules for double precision calculations (166) and performs double precision calculations using these NaN propagation rules (168) for double precision calculations. Implementing this typically requires very little modification to the underlying op code, such as addition of an additional line to the op code of the underlying hardware to enable selection of the appropriate set of NaN propagation rules. Also, since the difference between the NaN propagation rules may be very minor, it is possible to use substantially the same sets of NaN propagation rules, with minor modifications to account for the differences in the calculations taking place. Likewise, the same set of NaN propagation rules could be used, but the hardware could be configured to modify the NaN propagation rules depending on the precision of the calculation being performed. The modification by the hardware or software running on the hardware is functionally the same as providing two separate sets of NaN propagation rules.

By dynamically selecting an appropriate set of NaN propagation rules depending on the required precision, it is possible to ensure proper NaN propagation during higher precision calculations using lower precision hardware. Although the embodiment described above relates to dynamically selecting between double precision NaN propagation rules and quad precision NaN propagation rules, other selection processes could be used. Thus, for example, if higher than quad precision was required, and if the floating point arithmetic unit was capable of processing higher than quad precision calculations, proper NaN propagation could be ensured by providing the microcode memory unit with additional sets of NaN propagation rules and providing for dynamic selection of the proper set depending on the precision of the calculation being performed by the floating point arithmetic unit. One method of dynamically selecting from a plurality of sets of NaN propagation rules is illustrated in FIG. 5.

As shown in FIG. 5, proper NaN propagation can be ensured in a processor capable of providing multiple levels of precision by programming the floating point arithmetic unit to dynamically select the appropriate set of NaN propagation rules. To do this, the floating point arithmetic unit first determines the level of precision of the calculation to be performed (170). The floating point arithmetic unit then selects an appropriate set of NaN propagation rules according to the precision of the calculation being performed by the floating point arithmetic unit (172). Preferably the sets of NaN propagation rules will be available to the floating point arithmetic unit by being stored in a device such as the microcode memory unit 126. Alternative storage locations or methods of providing the floating point arithmetic unit with the appropriate set of NaN propagation rules may vary depending on the particular circuitry implementing the method. Finally, the floating point arithmetic unit uses the selected set of NaN propagation rules while performing the calculation to ensure proper propagation of NaNs (174).

FIG. 6 illustrates an alternative embodiment of a method of propagating NaNs through a floating point arithmetic unit having double precision architecture that is dedicated to performing quad precision calculations. As shown in FIG. 6, a floating point arithmetic unit dedicated to processing quad precision calculations first accesses quad precision NaN propagation rules (180), and then uses the accessed quad precision NaN propagation rules during quad precision calculations on the lower-precision architecture (182). By using this procedure, proper NaN propagation is ensured during high precision calculations without requiring high precision hardware.

While propagation of NaNs has been described with respect to implementation in a fused-multiply-add type floating point arithmetic unit, it may be possible to implement this type of solution to the propagation of NaNs in other types of processors. Accordingly, the method of propagating NaNs is not limited to implementation in the specific floating point arithmetic unit described above, but may instead be implemented in any processing unit, circuitry or process that seeks to provide high precision calculations.

Likewise, it may be possible to implement the NaN propagation rules using structure other than tables. For example, the NaN propagation rules for double precision could be represented by a series of if statements, e.g.:

1. if f3=NaN then return NaN in f3;
2. else if f4=NaN then return NaN in f4;
3. else if f2=NaN then return NaN in f2.

Likewise, the NaN propagation rules for quad precision could be represented by a series of statements for fma, fnma and fms:

1. if f3=1 and f3=NaN and f4=NaN then return NaN in f2;
2. else if f3=NaN then return NaN in f3;
3. else if f4=NaN then return NaN in f4;
4. else if f2=NaN then return NaN in f2.

and for fmal and fnmal:

1. if f3=1 and f3=NaN and f4=NaN then return NaN in f2;
2. else if f2=NaN then return NaN in f2;
3. else if f3=NaN then return NaN in f3;
4. else if f4=NaN then return NaN in f4.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. An apparatus, comprising:
a floating point arithmetic unit adapted to perform calculations having a first precision and being capable of performing calculations having a second precision higher than the first precision as well as calculations having the first precision, said floating point arithmetic unit comprising:
a control unit for controlling operation of the floating point arithmetic unit; and
a microcode memory configured to provide the control unit with one of at least two sets of NaN propagation rules depending on the precision of the calculation to be performed by the floating point arithmetic unit.

2. A method of performing floating point arithmetic, comprising:

accessing quad precision NaN propagation rules; and using the quad precision NaN propagation rules while performing quad precision calculations on a lower precision floating point arithmetic unit.

3. The method of claim 2, wherein the lower precision floating point arithmetic unit is a double precision floating point arithmetic unit.

4. A method of performing calculations, comprising:

determining a precision of a calculation to be performed;

selecting an appropriate set of NaN propagation rules according to the precision of the calculation to be performed; and using the selected set of NaN propagation rules in connection with performing the calculation.

5. The method of claim 4, wherein said appropriate set of NaN propagation rules is at least one of a set of double precision NaN propagation rules and a set of quad precision NaN propagation rules.

6. A method of operating a floating point arithmetic unit, comprising:

dynamically determining if a calculation to be performed is to be a quad precision calculation or a double precision calculation;

performing the quad precision calculation using quad precision NaN propagation rules if it is determined that the quad precision calculation is to be performed; and performing the double precision calculation using double precision NaN propagation rules if it is determined that the double precision calculation is to be performed.

7. The method of claim 6, wherein performing the quad precision calculation comprises:

setting NaN propagation rules for a quad precision algorithm; and performing quad precision operations using the quad precision NaN propagation rules if the calculation is to be a quad precision calculation.

8. The method of claim 6, wherein performing the double precision calculation comprises:

setting NaN propagation rules for a double precision algorithm; and performing double precision operations using the double precision NaN propagation rules if the calculation is to be a double precision calculation.

9. The method of claim 6, wherein the double precision NaN propagation rules and the quad precision NaN propagation rules are stored in two separate tables.

10. The method of claim 6, wherein the double precision NaN propagation rules and the quad precision NaN propagation rules are stored in a single table.

11. The method of claim 10, wherein the double precision NaN propagation rules are a subset of the quad precision NaN propagation rules.

12. A method of performing mathematical operations in a floating point arithmetic unit, comprising:

receiving an instruction to perform a mathematical operation;

determining if the mathematical operation is to be performed using quad precision or double precision;

dynamically accessing from a microcode memory one of a set of NaN propagation rules for quad precision and a set of NaN propagation rules for double precision according to whether the mathematical operation is to use quad precision or double precision; and controlling circuitry of said floating point arithmetic unit to perform said mathematical operation using the dynamically accessed set of NaN propagation rules.

13. A set of NaN propagation rules configured to properly propagate NaNs during high precision calculations on lower precision hardware, said hardware being configured to perform the function $f1=f3*f4+f2$, said set of NaN propagation rules comprising:

at least one first rule governing NaN propagation when each of f3, f4 and f2 is a NaN, at least one second rule governing NaN propagation when more than one of f3, f4 and f2 is a NaN; and at least one third rule governing NaN propagation when more than one of f3, f4 and f2 is a NaN and addition is being performed.

14. The set of NaN propagation rules of claim 13, wherein said at least one first rule and said at least one second rule together comprise seven unique rules, each of said seven unique rules governing NaN propagation for a unique combination of NaNs.

15. The set of NaN propagation rules of claim 14, wherein said seven unique rules comprise:

one rule governing NaN propagation where f4 is a NaN and f2 and f3 are not NaNs;

one rule governing NaN propagation where f3 is a NaN and f2 and f4 are not NaNs;

one rule governing NaN propagation where f2 is a NaN and f3 and f4 are not NaNs;

one rule governing NaN propagation where f3 and f4 are NaNs and f2 is not a NaN;

one rule governing NaN propagation where f2 and f4 are NaNs and f3 is not a NaN;

one rule governing NaN propagation where f2 and f3 are NaNs and f4 is not a NaN; and one rule governing NaN propagation where f2, f3 and f4 are all NaNs.

16. The set of NaN propagation rules of claim 14, further comprising:

one rule governing NaN propagation where f2 and f4 are NaNs and f3 is 1.

17. The set of NaN propagation rules of claim 16, wherein when f3 is 1 causes a unique register in the hardware to be used.

* * * * *

UNITED STATES PATENT AND TRADEMARK OFFICE
CERTIFICATE OF CORRECTION

PATENT NO. : 6,138,135
DATED : October 24, 2000
INVENTOR(S) : Alan H. Karp

It is certified that error appears in the above-identified patent and that said Letters Patent is hereby corrected as shown below:

<u>Column 14,</u>
Line 24, delete "aNaN" and insert therefor -- a NaN --

Signed and Sealed this

Eighteenth Day of June, 2002

*Attest:*

*Attesting Officer*

JAMES E. ROGAN
*Director of the United States Patent and Trademark Office*